US009747565B2

(12) United States Patent
Barbosa et al.

(10) Patent No.: US 9,747,565 B2
(45) Date of Patent: *Aug. 29, 2017

(54) SYSTEM AND METHODS FOR MANAGEMENT OF MOBILE FIELD ASSETS VIA WIRELESS HANDHELD DEVICES

(71) Applicant: INTELLECTUAL VENTURES II LLC, Wilmington, DE (US)

(72) Inventors: Frank A. Barbosa, Carrollton, TX (US); Luis M. Ortiz, Albuquerque, NM (US)

(73) Assignee: Intellectual Ventures II LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/071,003

(22) Filed: Mar. 15, 2016

(65) Prior Publication Data

US 2016/0307144 A1    Oct. 20, 2016

Related U.S. Application Data

(60) Continuation of application No. 14/480,297, filed on Sep. 8, 2014, now Pat. No. 9,299,044, which is a
(Continued)

(51) Int. Cl.
*H04W 64/00* (2009.01)
*G06Q 10/06* (2012.01)
(Continued)

(52) U.S. Cl.
CPC ..... *G06Q 10/063114* (2013.01); *G06Q 10/06* (2013.01); *G06Q 10/063118* (2013.01);
(Continued)

(58) Field of Classification Search
CPC ...... G06Q 10/06; G06Q 10/08; G06Q 10/087; G06Q 50/30; G06Q 50/08; H04L 67/1095; H04W 60/00
(Continued)

(56) References Cited

U.S. PATENT DOCUMENTS

| 5,202,817 A | 4/1993 | Koenck et al. |
| 5,444,615 A | 8/1995 | Bennett et al. |

(Continued)

FOREIGN PATENT DOCUMENTS

JP    408055161    2/1996

OTHER PUBLICATIONS

McCullough, Bob et al.; "Construction Field Data Aquistition with Pen-Based Computers"; May/Jun. 1993; vol. 119; Purdue University School of Civil Engineering; pp. 374-384.
(Continued)

*Primary Examiner* — Melur Ramakrishnaiah
(74) *Attorney, Agent, or Firm* — Schwabe, Williamson & Wyatt

(57) ABSTRACT

Communication from enterprise servers to handheld devices in the field supports dispatch, data synchronization, logistics and personnel. Bi-directional data delivery from enterprise-based servers over wireless data networks is enabled using wireless capabilities resident in handheld personal computing devices. Real time communications facilitates real-time access to remote programs, assistance and/or information related to the field operations and asset (personnel and inventory) resource management. Management is facilitated for at least one of: construction industry project analysis, HVAC system analysis, project management, equipment readiness inspection, troubleshooting, inventory tracking, inventory ordering, sales (e.g., providing cost estimates to customers), customer invoicing, conducting legal investiga-
(Continued)

tions, field data collection, and multi-user remote function coordination.

15 Claims, 9 Drawing Sheets

Related U.S. Application Data division of application No. 13/925,692, filed on Jun. 24, 2013, now Pat. No. 8,862,184, which is a continuation of application No. 12/547,363, filed on Aug. 25, 2009, now Pat. No. 8,494,581, which is a continuation of application No. 11/262,699, filed on Oct. 31, 2005, now Pat. No. 7,593,751, which is a continuation of application No. 09/955,543, filed on Sep. 17, 2001, now Pat. No. 6,961,586.

(60) Provisional application No. 60/233,120, filed on Sep. 18, 2000.

(51) Int. Cl.
| | |
|---|---|
| *G06Q 10/08* | (2012.01) |
| *G06Q 50/08* | (2012.01) |
| *G06Q 50/30* | (2012.01) |
| *H04L 29/08* | (2006.01) |

(52) U.S. Cl.
CPC .......... *G06Q 10/08* (2013.01); *G06Q 10/087* (2013.01); *G06Q 50/08* (2013.01); *G06Q 50/30* (2013.01); *H04L 67/1095* (2013.01); *H04W 64/00* (2013.01)

(58) Field of Classification Search
USPC .......... 455/556.1, 556.2, 66.1, 90.01, 90.02, 455/90.03; 705/400, 500, 9
See application file for complete search history.

(56) References Cited

U.S. PATENT DOCUMENTS

| | | | |
|---|---|---|---|
| 5,561,446 A | 10/1996 | Montlick | |
| 5,566,069 A | 10/1996 | Clark | |
| 5,765,140 A | 6/1998 | Knudson | |
| 5,907,829 A | 5/1999 | Kida | |
| 5,917,405 A | 6/1999 | Joao | |
| 5,935,209 A | 8/1999 | Budhraja et al. | |
| 5,938,721 A | 8/1999 | Dussell | |
| 5,990,932 A | 11/1999 | Bee et al. | |
| 6,064,968 A | 5/2000 | Schanz | |
| 6,083,353 A | 7/2000 | Alexander, Jr. | |
| 6,166,734 A | 12/2000 | Nahi et al. | |
| 6,172,620 B1 | 1/2001 | Brick et al. | |
| 6,192,381 B1 | 2/2001 | Stiegemeier et al. | |
| 6,216,108 B1 | 4/2001 | LeVander | |
| 6,256,661 B1 | 7/2001 | Terahama et al. | |
| 6,305,603 B1 | 10/2001 | Grunbok et al. | |
| 6,317,039 B1 | 11/2001 | Thomason | |
| 6,338,053 B2 | 1/2002 | Uehara et al. | |
| 6,385,510 B1 | 5/2002 | Hoog et al. | |
| 6,393,271 B1 | 5/2002 | Dougherty | |
| 6,425,525 B1 | 7/2002 | Swaminathan et al. | |
| 6,532,360 B1 | 3/2003 | Shaffer | |
| 6,549,917 B1 | 4/2003 | Pollard et al. | |
| 6,556,976 B1 | 4/2003 | Callen | |
| 6,574,672 B1 | 6/2003 | Mitchell et al. | |
| 6,587,835 B1 | 7/2003 | Treyz et al. | |
| 6,609,090 B1 | 8/2003 | Hickman et al. | |
| 6,650,647 B1 | 11/2003 | Ishikawa et al. | |
| 6,662,193 B1 | 12/2003 | Christensen | |
| 6,901,434 B1 | 5/2005 | Lunsford | |
| 6,947,976 B1 | 9/2005 | Devitt et al. | |
| 6,961,586 B2 | 11/2005 | Barbosa | |
| 6,971,063 B1 | 11/2005 | Rappaport | |
| 6,983,253 B1 | 1/2006 | Maul et al. | |
| 7,006,977 B1 | 2/2006 | Attra et al. | |
| 7,064,749 B1 | 6/2006 | Enmei | |
| 7,139,564 B2 | 11/2006 | Hebert | |
| 7,191,218 B1 * | 3/2007 | Innes | H04L 51/38 709/206 |
| 7,593,751 B2 | 9/2009 | Barbosa | |
| 7,712,669 B2 | 5/2010 | Mahany et al. | |
| 8,494,581 B2 | 7/2013 | Barbosa | |
| 8,862,184 B2 | 10/2014 | Barbosa | |
| 9,299,044 B2 | 3/2016 | Barbosa | |
| 2001/0011308 A1 | 8/2001 | Clark | |
| 2001/0018663 A1 | 8/2001 | Dussell | |
| 2002/0029208 A1 | 3/2002 | Josephson | |
| 2002/0065728 A1 | 5/2002 | Ogasawara | |

OTHER PUBLICATIONS

Williams, Trevor; "Applying Portable Computing and Hypermedia to Construction"; May/Jun. 1994; vol. 10; Department of Civil Engineering, Rutgers—The State University; pp. 41-45.

McCullough, Bob et al.; "Autmating Field Data collection in Maintenance Operations" Purdue University School of Civil Engineering; Aug. 21, 1997; pp. 1-25.

Crow, Ed et al. "Wireless Handheld Electronic Devices Assisting Emergency Medical Field Personnel" Pennsylvania State University Applied Research Laboratory; Aug. 16, 2000; 11 Pages.

El-Omari Samir et al.; "Data Acquisition from Construction Sites for Tracking Purposes" Concordia University Montreal Canada, Department of Building, Civil and Environmental Engineering; 1994; pp. 1-13.

Morrow, M. "Wireless The Key to Real-time Damage Assessement", Jun. 2, 2002; Directions Magazine; online: www.directionsmag.com/articles/wireless-the-key-to-real-time-damage-assessement/124052.

FieldWorker Products Ltd.; "Rapid Application Development Tool for Mobile Solutions".

Qualcomm; "OmniOne Mobile Communications Solution".

Accenture; "Mobile Field Service Solutions".

Symbol Technologies, Inc.; "Field Service Market Overview".

Field Centrix; "Mobile field Service—An Applications Blueprint".

\* cited by examiner

SYSTEM AND METHODS FOR MANAGEMENT OF MOBILE FIELD ASSETS VIA WIRELESS HANDHELD DEVICES

RELATED APPLICATIONS

This application is a continuation of U.S. patent application Ser. No. 14/480,297, filed Sep. 8, 2014, now issued as U.S. Pat. No. 9,299,044, which is a division of U.S. patent application Ser. No. 13/925,692, filed Jun. 24, 2013, now issued as U.S. Pat. No. 8,862,184, which is a continuation of and claims priority to U.S. patent application Ser. No. 12/547,363 filed Aug. 25, 2009, now issued as U.S. Pat. No. 8,494,581, which is a continuation of and claims priority to U.S. patent application Ser. No. 11/262,699, filed Oct. 31, 2005, now issued as U.S. Pat. No. 7,593,751, which is a continuation of and claims priority to U.S. patent application Ser. No. 09/955,543, filed Sep. 17, 2001, now issued as U.S. Pat. No. 6,961,586, which claims priority to U.S. provisional patent application Ser. No. 60/233,120, filed Sep. 18, 2000, all of which are incorporated herein by reference in their entirety.

FIELD OF THE INVENTION

The present invention is generally related to systems and methods of managing mobile assets in the field such as personnel, equipment and inventory via communications with handheld data management devices (e.g., personal digital assistants, handheld computers, two-way pagers, Web/WAP-enabled telephony, etc.) located in the field. More particularly, the present invention is related to systems and methods in the management of mobile field assets via wireless handheld devices.

BACKGROUND

Limitations that have been experienced with the growth of services in many of the professions, trades and industries can be attributed to the expansion of remote or distributed field activities, such as situation/location assessments, estimates or appraisals. New technology and less experienced personnel may be undertaking the initial tasks of customer interaction, sales, data collection and/or the analysis and troubleshooting of problems in the field. Personnel in field are usually required to collect data regarding a field situation that is generally be used later by more senior, experienced and/or responsible personnel to make decisions (business, technical, administrative and/or political). Even the most experienced professionals may find themselves lacking access to critical information or support that would be helpful in undertaking field operations. Efficiency in the remote dispatching of personnel given personnel vs. customer or field locations, as well as asset and inventory control can also be improved.

As an example of a field situation, individuals in the construction industry are often responsible for carrying out field assessments and providing estimates. The consequences of under bidding a project in the construction field can be very costly and/or can affect performance and quality of services/activities related to the underbid project. In cases where a project cost estimate, or bid, must be provided for a construction project, a business owner or senior journeymen can oftentimes be compelled to personally go to the field and collect information regarding a project in order to render a realistic and profitable bid because an inexperienced estimator might render an inaccurate appraisal. Construction project estimates require an accurate assessment and analysis of a job-site/projects in order to develop the data/facts necessary for an estimate to be rendered regarding use of labor, materials and completion time for a project.

If an operator in the field was provided with guidance, access to supplemental information and/or years of experience (e.g., lessons learned by senior personnel), field operations might proceed more accurately and professionally. Field operators, however, are unlikely to have reasonable means to efficiently access the information or the information can not be updated. Materials typically used in the field can include reference materials such as codes, regulations, inventory and price lists.

Personal digital assistant (PDA) is a generic name used for a device belonging to a family of portable handheld data managing devices well known in the art. Another word used to refer to such devices is the word "Smartphone." Currently, handheld data management devices such as PDAs or Palm PCs can have as much computing power as desktop personal computers and can be used in a wide variety of applications, including wireless communication (infrared and radio frequency), GPS (global positioning system) mapping, Internet access and database storage. Web-phones are also being introduced into the wireless marketplaces that have PDA-like capabilities.

Handheld data management devices are generally enabled with wireless connectivity to data sources over, for example, the connection-oriented Transmission Control Protocol/Internet Protocol (TCP/IP) or message oriented TME/X protocol. Cellular Digital Packet Data (CDPD) is a TCP/IP based technology that supports Point-to-Point Protocol (PPP) or Serial Line Internet Protocol (SLIP) wireless connections to mobile devices. Cellular service is generally available throughout the world from major service providers. With CDPD, data can be transferred over switched Public Switched telephone Network (PSTN) circuits or packet-switched networks. Global System for Mobile Communication (GSM) and Personal Communications Systems (PCS) networks operate in the 800 MHz, 900 MHz, and 1900 MHz range. PCS provides narrowband digital communications in the 900 MHz range for paging, and broadband digital communications in the 1900 MHz band for cellular telephone service. In the U.S. as of the priority date for the present embodiments, PCS 1900 is identical to GSM 1900. GSM operates in the 900 MHz, 1800-1900 MHz frequency bands. GSM 1800 is widely used throughout Europe and throughout many parts of the world. In the U.S., GSM 1900 is the same as PCS 1900; thus, these two technologies are compatible.

The Code Division Multiple Access (CDMA) network is a digital wireless network that defines how a single channel can be segmented into multiple channels using a pseudo random signal (or code) to identify each user's information. Because CDMA spreads each call over more than 4.4 trillion channels across the entire frequency band, it is more immune to interference than TDMA or other current wireless networks and can support more users per channel in some situations. Time Division Multiple Access (TDMA) cellular/wireless systems are currently deployed throughout the wireless communication markets. Wideband CDMA (W-CDMA), which is called CDMA 2000 in North America, will be implemented in the U.S.A. in the near future. W-CDMA is a true 3G wireless technology. W-CDMA increases transfer rates by using multiple 1.25 MHz cellular channels compared to the single channel currently used by CDMA 1.

The General Packet Radio Service (GPRS) network is a 2.5G technology that bridges the gap between the current wireless technologies and the next generation of wireless technologies known as 3G wireless technologies. GPRS is a packet-data transmission technology. GPRS will work with CDMA and TDMA, and it supports X.25 and IP communications protocols. It will also enable features like Voice over IP (VOIP) and multimedia services. Bluetooth is a Personal Area Network (PAN) technology. Adopted by a consortium of wireless equipment manufacturers called the Bluetooth Special Interest Group (BSIG), it is emerging as a global standard for low cost wireless data and voice communication. The current specification for this standard is the 2.4 GHz ISM frequency band.

Bluetooth technology is based on a short-range radio transmitter/receiver built into small application specific circuits (ASICs) and embedded into support devices. Initially, Bluetooth enabled devices will have 1 mw of transmitter power and will be capable of asymmetrical data transfers of up to 721 Mbps over distances of 10 M. The Bluetooth specification permits up to 100 mw of power, which will increase the range to 100 M. In addition, it can support up to three voice channels. Using short data packets and frequency hopping of up to 1600 hops per second, it is a true 3G wireless technology that will enable a host of new applications and possibilities for wireless data communication. Wireless application protocol (WAP) and Extensible Markup Language (XML) are examples of current technology being used in wireless devices and system to provide Web-based (Internet) content on wireless devices.

Despite the growing power and popularity of portable data management devices and the diverse telecommunications alternatives for data communication, few applications were available as of September 2000 (the priority date for the embodiments herein) that directly relate to interactive or industry-specific programs providing management of associated data and providing users with access to daily business practices and procedures related to a particular industry.

As of the priority date of the present embodiments (Sep. 18, 2000), what was, and continue to be, needed in business, government and industry where field operators are utilized is a system and method for managing assets in the field via wireless handheld devices. Systems were, and remain, needed by businesses that could enable their field operators (e.g., users, operators, estimators, investigators, salesmen, and the like) to more efficiently and accurately operate in the field.

SUMMARY OF THE INVENTION

It is an object of the present invention to provide a system and methods for managing asset in the field (e.g., personnel, equipment and/or inventory) via handheld devices.

It is an aspect of the present invention to provide field operators portable access to industry-specific field data management programs ("programs") and data useful in carrying out field operations.

It is another aspect of the present invention to provide a handheld data management device and solutions for assisting personnel in finding and conducting field operations.

It is another aspect of the present invention to provide methods for field operations data synchronization and/or delivery using wireless capabilities resident in handheld personal computing devices. Data can be synchronized from handhelds with a server operating as their manager over a network using wireless radio transmission.

It is another aspect of the present invention to provide for two-way communication between remote computing means (e.g., servers, desktop computers) and handheld data management devices to facilitate real-time access to remote programs, assistance and/or information related to the field operations being undertaken by handheld data management device users.

A handheld device for use in the management of assets and data during operations in the field can include a server for operating at least one field data management program and managing remote assets in the field and field data; a microprocessor for executing said at least one field data management program; at least one field data management program stored within said memory and including instructions for enabling users to: find a field location, collect data at the field location, communicate with a remote server while at the field location, retrieve new data from the server that is associated with the collected data; a wireless communication module for providing access to the remote server by said handheld data management device; and a user interface adapted for enabling the handheld data management device user to interact with said at least one field data management program.

A programming module containing field data management software can include software used to accomplish at least one of: construction industry project analysis, HVAC system analysis, project management, equipment readiness inspection, troubleshooting, inventory tracking, inventory ordering, sales (e.g., providing cost estimates to customers), customer invoicing, conducting legal investigations, field data collection, and multi-user remote function coordination.

A method of conducting a field operation using a handheld data management device can include the steps of providing access to an industry-specific field operations program module; executing said program module to conduct a field operation; providing field-specific information required by said program module for said program module to render data from said module useful in support of said operations; and retrieving data from said handheld data management device in support of said operations. The method can further include providing data to a remote resource (e.g., server or live expert) for analysis, and retrieving enhanced data from said remote resource for use in conducting the field operations.

A method of conducting operations in the field utilizing a handheld data management device, can also include the steps of obtaining directions to a field location using positioning and navigation means provided through said handheld data management device; starting a program associated with the field problem; providing specific information required by the field data management program and related to the field problem; analysis of said specific information by said handheld data management device; and rendering output by said handheld data management device for use in support of said field problem.

The foregoing has outlined some of the more pertinent features of the present invention. These features should be construed to be merely illustrative of some of the more prominent features and applications of the invention. Many other beneficial results can be attained by applying the disclosed invention in a different manner or modifying the invention as will be described. Accordingly, other aspects and a fuller understanding of the invention can be had by referring to the following Detailed Description of the preferred embodiment.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF PREFERRED EMBODIMENTS

The present invention now is described more fully hereinafter with reference to the accompanying drawings, in which preferred embodiments of the invention are shown. Like numbers refer to like elements throughout. This invention can, however, be embodied in many different forms and should not be construed as limited to the embodiments set forth herein; rather, these embodiments are provided so that this disclosure will be thorough and complete, and will fully convey the scope of the invention to those skilled in the art.

Aspects of the present invention are directed to assisting people in the field with operating in the field and, for example, rendering accurate assessments of a field situation, job, environment, customer contact, project, etc. Reference to a particular field environment (e.g., projects within the construction industry) made throughout the description are provided for exemplary purposes only and should not be taken as a limitation of the present invention. The present invention provides portable, handheld data management devices (e.g., handheld or palm computer/PC, PDA, smart phone, mobile telephony devices) with access to industry/profession-specific processes and applications that can enable users to be more productive while operating in the field.

Figure 1:
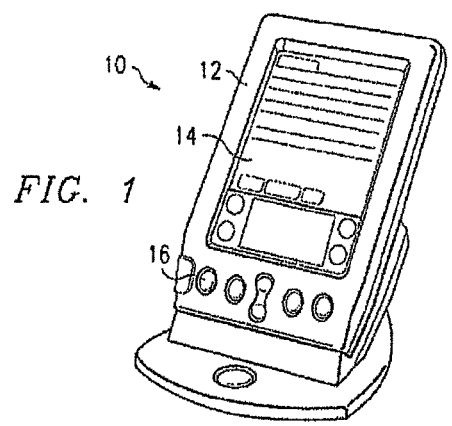
FIG. 1 is a perspective view of a portable electronic device usable in accordance with methods of the present invention.

A handheld data management device in accordance with the present invention can be in the form of any one of a number of commercially available hand-held devices such as personal digital assistants (PDAs), two-way pagers, and Web/WAP-enabled mobile phones. Referring to FIG. 1, a device 10 exemplary of a prior art PDA that could implement software and/or communication methods in accordance with carrying out methods of the invention is illustrated. The device 10 includes an outer housing 12 sufficiently small to be easily portable such that it substantially fit within the palm of a users hand, a display 14 that can also preferably include touch-screen technology to operate in combination with control buttons 16 to provide a User Interface (UI) for operating, controlling and/or otherwise interacting with the device 10. Not shown on the device 10, but well known in the art to be incorporated in such devices are communication ports (wired and wireless).

Figure 2:
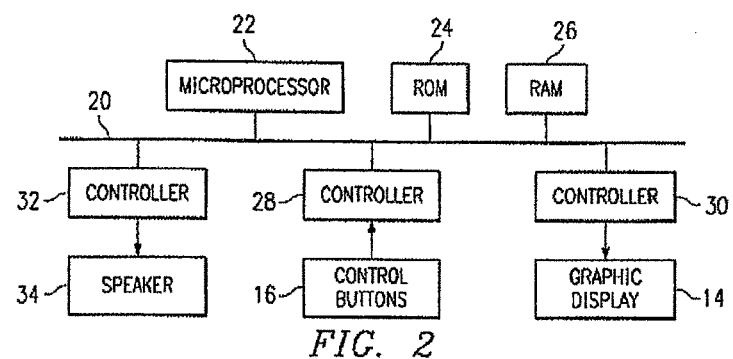
FIG. 2 is a block diagram of various components of the device.

FIG. 2 is a block diagram of various components of the device 10. The device 10 includes a system bus or plurality of system buses 20 to which various resident components are coupled and by which communication between the various components is accomplished. A processor 22 is connected to the system bus 20 and is supported by a read only memory (ROM) 24 and a random access memory (RAM) 26. The ROM 24 contains among other code the code controlling basic hardware operations. The RAM 26 is the main memory into which the operating system and application programs are loaded. Also connected to this system bus 20 are various I/O controllers, including a controller 28 providing the hardware interface for the control buttons 16, and a controller 30 providing the hardware interface for the display 14. A controller 32 provides the hardware interface for a speaker 34.

Figure 3:
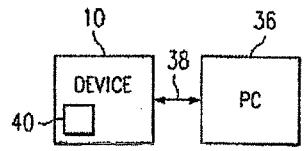
FIG. 3 is a block diagram of a device including a communication module to facilitate communication of the device.

One of the preferred implementations of the invention is as a set of instructions in a code module resident in the RAM 26 of the device. The set of instructions can however be stored in some other computer memory such as a hard disk drive of a personal computer (PC) or even downloaded from a server via the Internet until required by the device 10. As shown in FIG. 3, the device 10 can also include an integrated communication module 42 to facilitate wired and wireless communication. Communication can be had with remote resources 44 (e.g., servers) through network and to enable monitoring and feedback of field assessment operations. Wireless communication module 42 can include digital communication technology and/or wireless modem for facilitating local area communication. The module 42 can also use cellular wireless technology such as Cellular Digital Packet Data (CDPD). CDPD is a method of transmitting data in small packets of information over existing cellular phone networks. CDPD is a fully digital network overlay, providing all the benefits of digital service, including lower error rates and lower costs. Communications module 42 provides wireless real-time access to servers and personnel in support of assessments, and can also provide more traditional information available over networks, (e.g., e-mail, chat, Intranet and Internet information).

Figure 4:
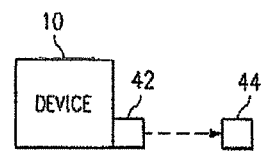
FIG. 4 is a block diagram showing an infrared communications link between the device and a personal computer.

As shown in FIG. 4, the device 10 can also communicate with a PC 36 through an infrared communications link 38 to exchange and update information both ways. This feature makes it particularly easy to update and change personal schedules as needed. The device 10 can include an integrated modem 40 to provide data transfer functions and for remote connectivity. This feature allows a person (such as a supervisor, counselor or service representative) remote from the user to provide tasks, answers to queries, notes and other information for use and display on the users device 10 using standard telecommunications technology (e.g., wired and wireless GSM, CDMA, CDPD, and paging networks).

Figure 5:
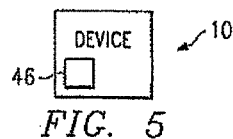
FIG. 5 is a block diagram showing a GPS module associated with the device.

Referring to FIG. 5, the handheld device can also be equipped within a position module 46 to enable the handheld device to utilize positioning systems or methods known in the art such as satellite position (e.g., Global Positioning System (GPS)) or signal triangulation techniques. A GPS compatible system, for example, can be used to determine device location information and can also provide navigational assistance to users (e.g., to find a field problem/job) when used in combination with navigation software or resources, such as Internet mapping resources available from the World Wide Web. A navigation module can include positioning and navigational capabilities. Commercially available navigation technology will allow users to download a door-to-door route from any two locations in the U.S. The device can constantly update the user's current position and provide updated directions. This feature allows point to point navigational instructions to be provided to users in the field.

In accordance with the present invention, a handheld device 10 can be interactive with the field operator when programs operated by the microprocessor ask questions or provide guidance related to a particular field problem. An interactive question and answer session can also include the provision of checklists and relevant data in support of a user dialogue with the device. Interactivity can also be provided to remote resources when two-way data communication is provided between the device and a remote server and/or support representative. As mentioned above, the present invention can be effectively practiced together with a client/server programming environment. As is known by those skilled in this art, client/server is a model for a relationship between two computer programs in which one program, the client, makes a service request from another program, the server, which fulfills the request. Although the client/server model can be used by programs within a single computer, it is more commonly used in a network where computing functions and data can more efficiently be distributed among many client and server programs at different network locations.

With a client/server relationship, multiple client programs can share the services of a common server. Client programs and Server programs are often part of a larger program or application. Relative to the Internet, a Web browser is a client program that requests services (the sending of Web pages or files) from a Web server (which technically is called a Hypertext Transport Protocol or HTTP server) in another computer somewhere on the Internet. Similarly, a computer with TCP/IP installed allows client requests for files from File Transfer Protocol (FTP) servers in other computers on the Internet.

Figure 6:
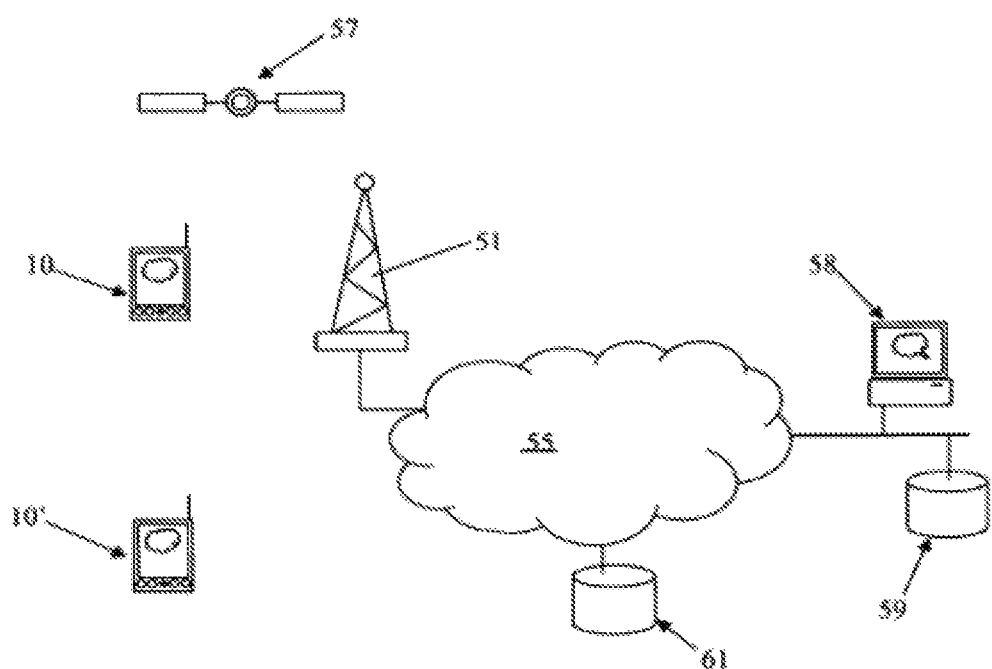
FIG. 6 is an illustration of a basic operational environment for the handheld device and methods of the present invention.

Referring to FIG. 6, an environment for extended operation/communication between a handheld device 10 (client) and remote management system 58 (e.g., server, desktop PC) is illustrated. At least one device 10/10' can be remotely linked to a management system that can provide instructions (e.g., templates, task/punch lists) and/or programs to a group of users. Instruction can be stored on a program locally on a user's personal digital assistant (PDA). Job templates and/or programs can also be centrally stored within one or more databases 61/59 accessible to the management system or directly by the handheld device 10/10'. Accordingly, users can access a central template through a private or public computer network in a conventional manner via wireline or wireless communications. By maintaining a template in a central location, such as a management system, updates can be made to the template as procedures, best practices, and/or laws are added, amended or deleted. Accordingly, users can be provided with up-to-date information on assessment activities.

A user operating in the field can utilize a handheld device 10 for the assessment of a field problem. The user can execute an industry-specific program (e.g., field data management program) on the handheld device 10 related to the problem being addressed. The user interacts with the handheld executed program to obtain an initial field assessment. The program would prompt the user for input of data related to the problem. During program execution, the user can access remote resources (e.g., information, data, and expert assistance) via wireless communication systems 51 and networks 55. Information can be obtained from a server 58 located at the user's enterprise, or from other network 55 resources available to the user (e.g., Web pages provided/obtained over the Internet). Real-time analysis of data obtained can also be undertaken by remote processor (e.g., server, desktop PC). At completion of data processing by a handheld device remote processor 10 a final output, such as a report, bid, recommendation, or the like can be provided to the user. The user can use the information to interact with a third party, render a final output for the third party, or to troubleshoot equipment. The remote processor (e.g., 58) can also be used as a collection point for data provided from multiple users (e.g., 10, 10'). The data would then be analyzed by the remote processor and a comprehensive report can result and be provided to the remote user/device location and data can also be provided via satellite 57. Location is determinable using, for example, GPS. A handheld device user can be provided with directions to a requested location, based on the user's position, either textually or through known mapping programs (e.g., mapping programs available over the Internet).

It should be appreciated that data collected with the device 10 can be processed without the assistance of remote resources and can be directly utilized to render output to the user via the device user interface, printed using data rendering devices, or can be stored in local memory for subsequent use (e.g., synchronization with a desktop, rendering, remote computation, compilation for use with input from other sources).

Data provided to remote systems can generally undergo computing operations beyond the resident capabilities of the handheld device. A limited software program can be used for gathering of data during a field assessment, where after a larger software application and computing resources may be necessary to render a comprehensive analysis relating to the particular field problem. A smaller handheld executed program, for example, may only provide a device user with a more abbreviated list of questions needed to address a field problem. For example, a larger computing capability can utilize data collected by several handheld devices deployed to assess field problems.

Methods of the present invention are now described more fully hereinafter with reference to the accompanying drawings, in which preferred embodiments of the invention are shown. Methods of the invention can, however, be embodied in many different forms and should not be construed as limited to the embodiments (e.g., method step sequences) set forth herein; rather, these embodiments are provided so that this disclosure will be thorough and complete, and will fully convey the scope of the invention to those skilled in the art. It will be understood after the teachings herein provided that each block of the flowchart illustrations, and combinations of blocks in the flowchart illustrations, can be implemented by computer program instructions. These computer program instructions can be provided to a processor of a handheld device (e.g., PDA, pager, WAP phone, Smartphone), general purpose computer (e.g., desktop), special purpose computer (e.g., server), or other programmable data processing apparatus to produce a machine, such that the instructions, which execute via the processor of the handheld device, remote computer, server or other programmable data processing apparatus, create means for implementing the functions specified in the flowchart block or blocks. It is generally known that servers or desktop computers have more processing capability than handheld devices. Furthermore, a server or desktop can be used as a centralized data collection and analysis facility for input received from more than one handheld device/user and as the manager of assets in the field.

Figure 7:
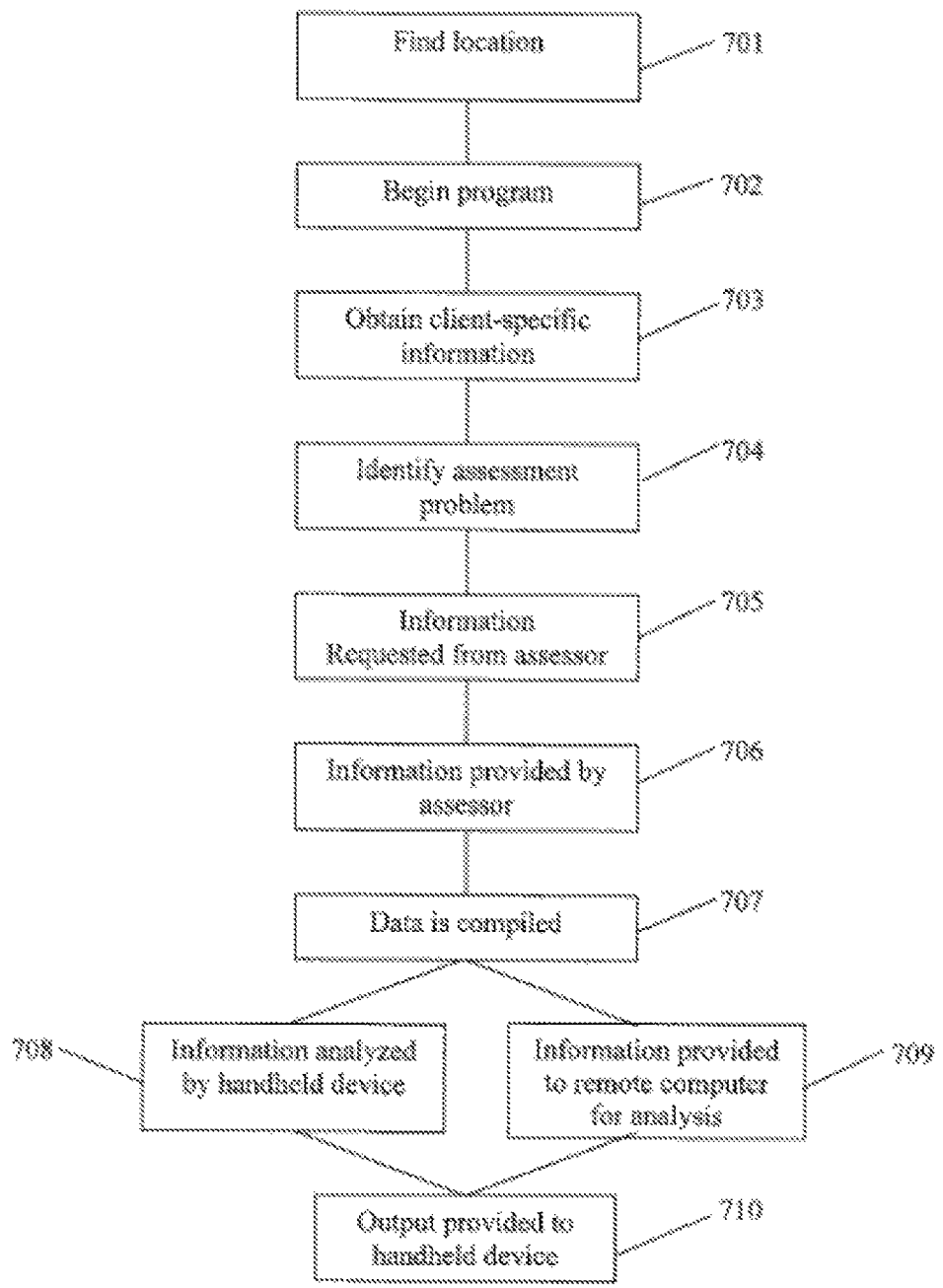
FIG. 7 illustrates a flow chart related to a construction industry in accordance with a method of the present invention.

Referring to FIG. 7, a flow chart related to a construction industry application will now be described. Again, the construction industry application is only exemplary of one type of field operation that can be facilitated with the present invention, and should not be taken as a limitation of the scope of the appended claims. A user can initially be directed to the prospective job site 701 through GPS navigation means on the handheld device relevant to a particular field problem. Once at the job site, the operator would start (for example) an appraisal program 702. The program can start by asking for the identification of a client or matter 703 (e.g., customer, or job site). The program can next ask the representative to identify the problem or type of operation or assessment 704 (e.g., service call, sales call, HVAC, plumbing, electrical, landscaping, etc.). This should enable only the most relevant questions and/or interaction to be invoked by the program. The program would then start asking the user specific questions, or provide initial information, related to the identified subject matter 705. The user would respond to program questions by providing specific answers/data 706, which would generally be provided in a format understandable by the program. It is assumed that operators/users would have the requisite training to utilize field data management programs. Interaction, however, would preferably be kept to a level that is reasonably intuitive to any reasonably experienced computer and handheld device user. At completion of the series of questions, the handheld device can automatically compile collected data 707 provided by user. The data can then be analyzed by the handheld device 708 or provide the data to a remote processor 709 via a network where the data will be analyzed. Data can be provided to the remote resource within a template recognizable by the remote processor/program. After the data is analyzed, the handheld device can provide output to the operator 710 (which may have been received from the remote processor) that can be in the form of an estimate or analysis and can be provided to the client or utilized by the operator to provide additional services.

In an industry-specific application, a field operator in the construction industry can be required to provide job cost estimates, status reports and/or complete a punch list of items. Programs for estimating a job and rendering bids can be more detailed and interactive than the mere provision of task/punch lists. For example, a job estimation program tailored for the heating and air conditioning industry can determine cooling load requirements based on data collected regarding a floor plan (square footage, duct work, number of vents, position of vents), currently used equipment (furnace, air compressor, valves, coil, tubing, etc.), condition of equipment and insulation. Load calculations can also be rendered on-site based on available building plans where input to program questions is based on data written on a set of architectural plans. In the heating and air conditioning (HVAC) industry for example, an inexperienced technician would greatly benefit from the provision of guidelines for troubleshooting HVAC equipment, such as a series of questions related to identified failure symptoms or the identified problem. The handheld device can also provide a technician with an outline of known systematic procedures.

In the case where an inexperienced operator, such as the inexperienced HVAC technician described above, is unable to properly assess a field problem, a transcript of the operator's interaction with the handheld (e.g., questions and responses) can be transmitted to remote resources for further analysis. The user can be provided, at the handheld device with additional assessment guidelines (e.g., another program, suggestions/advice, or targeted questions not asked by the handheld device program) from a remote processor or source. The operator can also be provided with, for example, a link to third party information relevant to the problem available on the Internet (e.g., information from an equipment manufacturer's site regarding the equipment being assessed by the technician).

Figure 8:
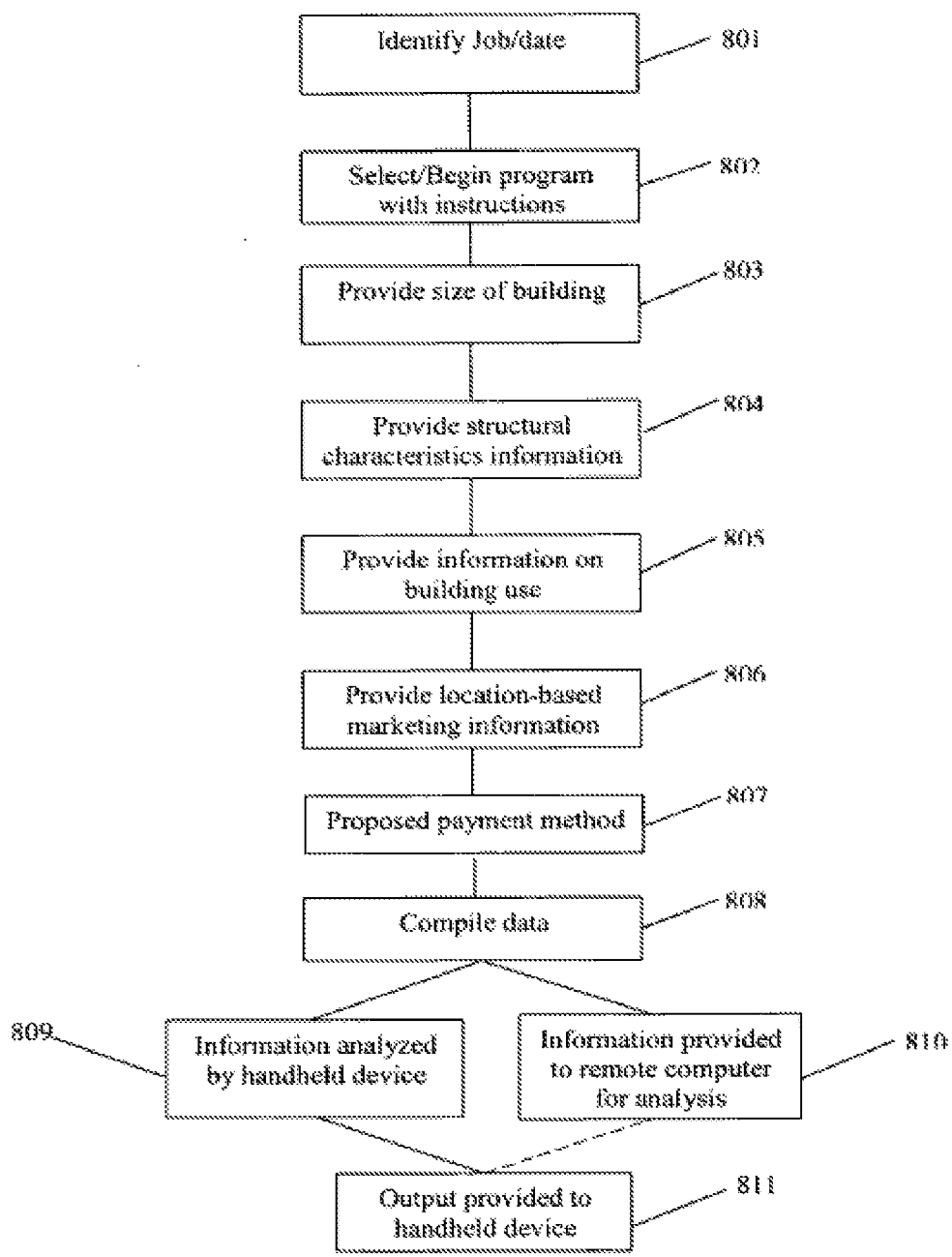
FIG. 8 illustrates a flow chart illustrating a more specific operation relating to the HVAC industry.

Referring to FIG. 8, a detailed flow chart illustrating a more specific assessment relating to the HVAC industry is described. The flow chart is directed to information useful in obtaining data needed to render an estimate for a HVAC project. Once a program is opened on the handheld device, the operator can be asked (e.g., prompted) to identify the job 801 (e.g., location, customer name, date, type of job). The current date may already be available from the handheld device, but in this case the projected start date can be provided for project scheduling (conflict checking) purposes. The operator can then select the type of program 802 to be utilized (e.g., HVAC sales estimating, problem troubleshooting, and efficiency determination). The operator can next be asked for the approximate size of the building 803 being assessed (generally based on heated/cooled square footage for HVAC applications). A operator can then be asked to provide structural characteristics of the building 804 (e.g., glass-type and location, the direction a building faces for determining solar exposure, ceiling height and ceiling type). Other categories not shown but which may be relevant to assessing a building are wall type, insulation type/rating, duct work type/insulation, pre-existing equipment type/rating. Use of the building can also be determined by the operator 805 (e.g., how the building occupied and typical traffic patterns). The type of business, if applicable, can have an impact on the assessment regarding accessibility for equipment and commercial operation patterns. Finally, location (e.g., Dallas/Fort Worth factor) can have an impact on the market price for an estimate. It may make a difference whether a job is being performed in a particular part of town or what the immediate surroundings of the property are like.

Project location information can be provided by the hand held device automatically via a resident GPS module as described in FIG. 5 and throughout the disclosure; however, location-based marketing information 806 (e.g., street access, landscaping that may be disturbed, new construction issues) can also impact the project and overall assessment. Payment information 807 can also be obtained to complete information needed to render, for example, a job estimate. Compilation 808, analysis 809/810, and useful output 811 aspects of the method are carried out and rendered after all data is collected by the operator. Other construction related fields that would benefit from a series of questions similar to the last example include, remodeling, plumbing, inspections, surveying, landscaping, windows sales and installation, floor covering contractors, etc. It should be appreciated that estimates can also be provided in non-construction sales using the present method.

Figure 9:
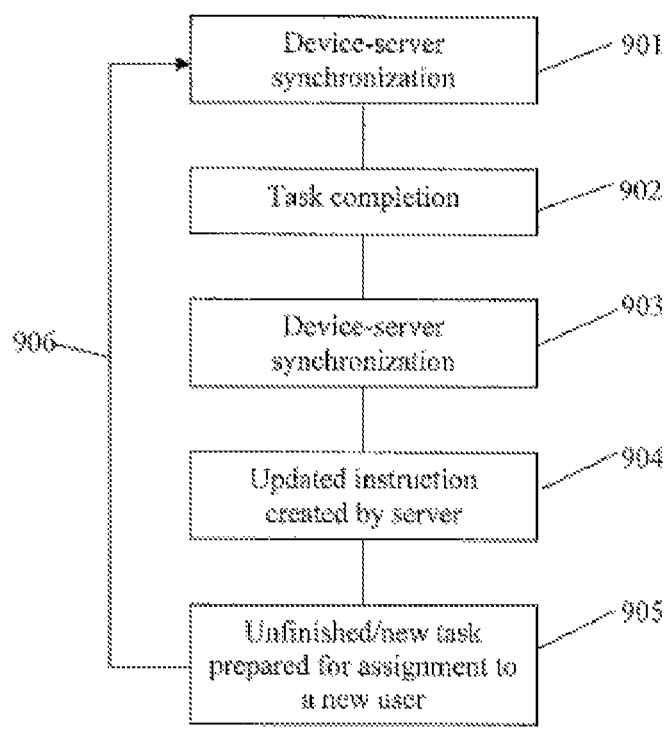
FIG. 9 illustrates a flow chart of a method relating to project management.

Referring to FIG. 9, a flow chart of a method relating to project management is described. Oftentimes, large projects in, for example, a manufacturing or design environment can have job aspects that are shared by members belonging to different work shifts. In accordance with the present invention, a program managed by a central computer/server can track every aspect of a project and provide worker with tasks via a template. A worker's handheld device (or device assigned to the worker for the shift) can be synchronized 901 with a server to receive an updated template containing tasks for the worker at the beginning of every work shift. A project member beginning a workday at a job site or on a shared project would generally be expected to ascertain the status of the project and attempt to complete tasks embodied within a template. The projects tasks and template (or program instructions) are generally expected to be completed by the worker 902 during and before the end of a shift. The worker reports 903 on the status of tasks at the end of the workday via synchronization with a server through wired and/or wireless means as described at the beginning of the disclosure. An updated template is created by the server 904 for a subsequent worker based on the project's updated status, needs and prior worker input. Unfinished business recorded by a prior worker and new tasks can be prepared within a template 905 for provision to the subsequent device/worker. The process is repeated for the duration of assigned projects 906, and for subsequent (new) projects. It is an advantage of the present invention to provide for project tracking, updated progress, and focused task lists to projects members. Project efficiency would increase with the present method. Workers utilizing a synchronized project task list to carry out their daily input into a project can insure that tasks completed task are not repeated (wasting time) and that unfinished tasks are addressed by a subsequent project member, possibly avoiding project delays and/or damages (e.g., monetary loss based on inefficiency).

Figure 10:
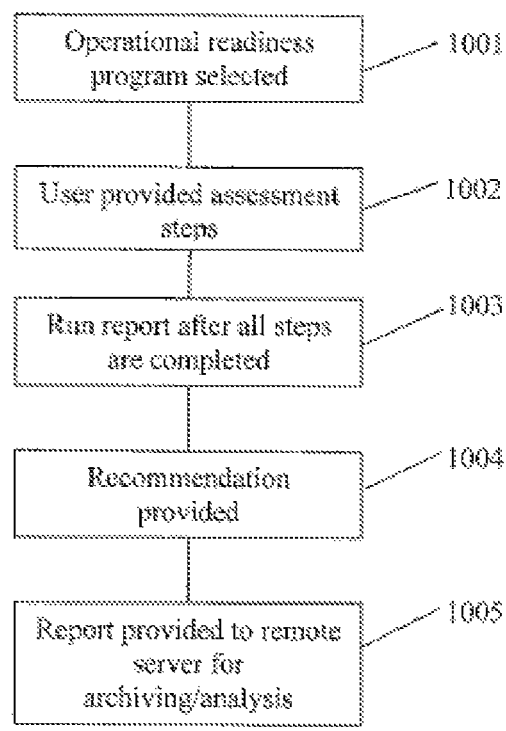
FIG. 10 illustrates a flow chart outlining a method relating to equipment readiness.

Referring to FIG. 10, a flow chart outlining a method relating to equipment readiness is described. An example relating to equipment readiness in the airline industry will be used, but is not meant to be limiting. Airline pilots generally work through a manual checklist prior to the operation of aircraft. In accordance with the present invention, a pilot can utilize a program executed on a handheld device to be guided through an equipment readiness checklist. The operator (pilot) selects the operational readiness program associated with the equipment being checked 1001. The program provides the operator with step-by-step instructions for checking the status of the equipment 1002. The checklist can be provided in the form of questions or statement (e.g., provide X gauge reading). Upon completion of the checklist, the user can run a report 1003 (or synchronized with a remote server for use by the system or monitors) describing the readiness (pass/fail) of the equipment. The report can include recommendations 1004 (e.g., troubleshooting criteria). Trouble shooting information together with a template of field test procedures can be provided to equipment technicians for repairing disorders. The report can be transmitted to a remote server 1005 for reporting/analysis. For example, the report (which preferably contains quantitative readings) can be synchronized with a black box located on an airplane. If there would ever be an issue as to whether equipment was properly checked out or if certain readings are indicative of causing equipment failures, the recorded information of the checklist would be useful in analyzing such issues.

Figure 11:
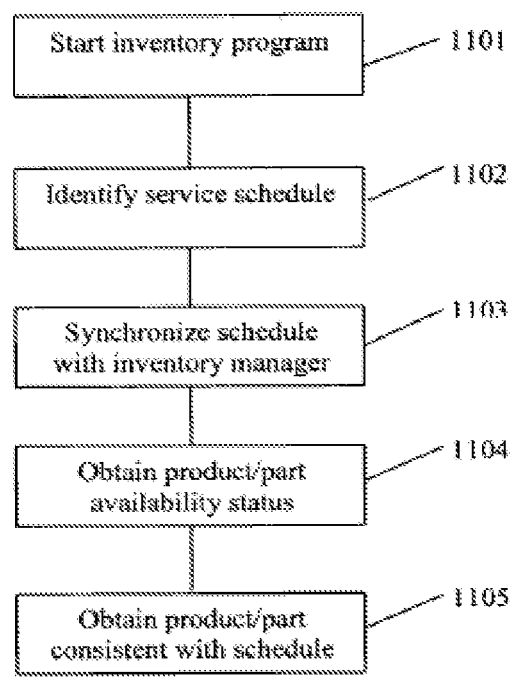
FIG. 11 illustrates a flow chart outlining a method relating to inventory tracking/ordering.

Referring to FIG. 11, a flow chart outlining a method relating to inventory tracking/ordering is described. Field technicians can utilize a handheld device to ensure that the proper inventory will be provided prior to embarking on a daily service schedule. The operator can start an inventory program 1101, identify a service schedule 1102, and synchronize the schedule 1103 with an inventory manager. The inventory manager assesses the schedule requirements and provides the technician with an inventory availability status 1104. The technician can coordinate inventory needs with the company automatically using this method so that no more inventory than is needed is taken to the field.

Figure 12:
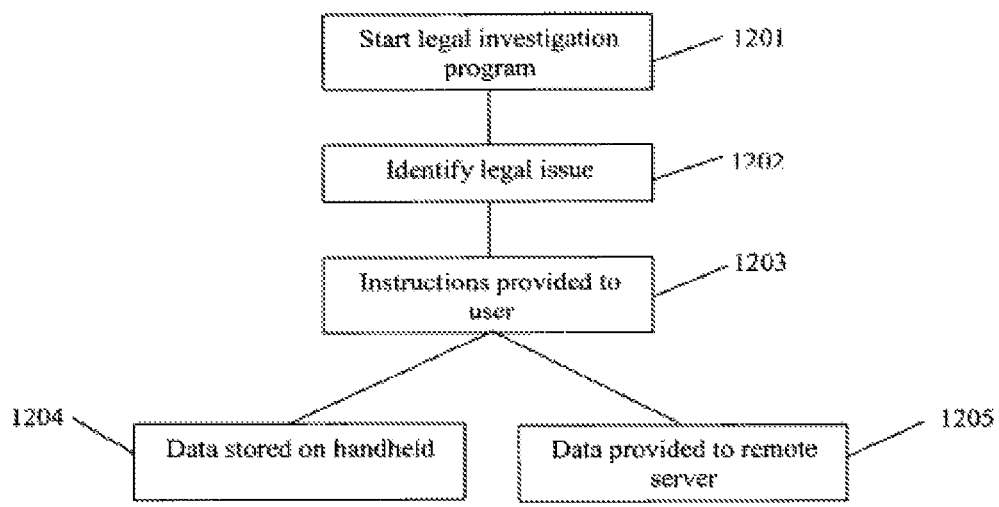
FIG. 12 illustrates a flow chart illustrating a field operation relating to conducting a criminal investigation.

Referring to FIG. 12, a flow chart illustrating an assessment relating to criminal investigation is described. Once the program opened 1201 on the handheld device, it can ask the operator to identify legal issues (e.g., crime) 1202. The operator can then select the type of investigation being undertaken (e.g., crime scene, witness interviews, forensics, etc.). Instructions can be provided regarding the legal elements of a specific crime and exemplary evidence needed to prove the elements. The checklist and legal elements can be tailored to a particular legal jurisdiction. The investigator can complete instructions by entering data relating to the investigation 1203. The checklist and/or data can be stored at the handheld 1204 for future reference, can be transmitted 1205 to a server for analysis (verification), and/or synchronized with computer for use in furtherance of an investigation. The ability to manage data from several investigators on large-scaled cases can be enhanced through the present invention, wherein comprehensive data from different sources can be analyzed, updated and reformatted for representation and distribution to plural case workers. Updated templates associated to a particular type of case can identify information shortfalls in a case.

Figure 13:
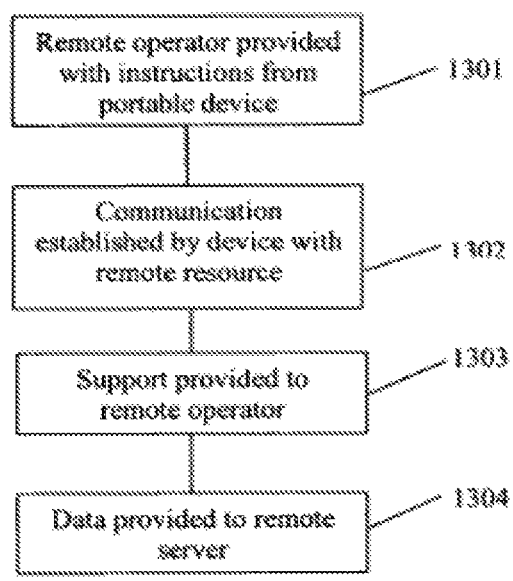
FIG. 13 illustrates a flow chart directed to multi-user functions in accordance with carrying out aspects of the present invention.

Referring to FIG. 13, a flow chart directed to multi-user functions in accordance with the teaching of the present invention is provided. As an example to describe a multi-user field assessment, assume several field operators/investigators are deployed to investigate and collect data over a broad area of land affected by an environmental catastrophe. Operators equipped with handheld devices are assigned/deployed to specific positions of the affected environment. An operator can first be provided initial instruction from a remote server 1301. Initial instructions can include summary information regarding the problem, required equipment, and Pinpoint directions to the assigned positions, which can be provided to operators utilizing GPS. In cases where an operator may already be deployed, the operator may only be provided with initial information/instructions. At their respective positions, remote operators are provided instruction from a portable device 1301. Communication is established between device and remote resource 1302 comprising unique/updated instructions for their respective assessment of the position (e.g., data collection instructions). The template/instructions can operate in combination with programs resident in the handheld computer or can be accompanied by a computer program transmitted from the server (e.g., in the form of a JAVA applet).

During data collection, the operator can gain support 1303, via communicates with remote resource (e.g., server, exert personnel). With a live expert, communication can be via chat or voice. Procedural guidance can be provided through two-way communication with remote representatives. After the data has been collected in accordance with the template/programs, the data can be transmitted to the resource 1304, wherein the data can be quickly and more accurately analyzed together with input from other personnel (e.g., experts, other field users). In the case where initial GPS information was not provided to/or obtained from the operator, GPS coordinates associated with the collected data can also be transmitted to the server with the collected data. The collected data and GPS coordinate associated with the collection of data would generally be the two most important attributes for the given scenario.

As will be appreciated by one of skill in the art, the present invention can be embodied as methods, data processing system, or computer program product. Accordingly, the present invention can take the form of an entirely hardware embodiment, an entirely software embodiment or an embodiment combining software and hardware aspects. Furthermore, the present invention can take the form of a computer program product on a computer-usable storage medium having computer-usable program code means embodied in the medium. Any suitable computer readable medium can be utilized including hard disks, CD-ROMs, optical storage devices, or magnetic storage devices.

Computer program code for carrying out operations of the present invention can be written in an object oriented programming language such as Java, Smalltalk or C++. The computer program code for carrying out operations of the present invention, however, can also be written in conventional procedural programming languages, such as the "C" programming language. The program code can be executed entirely on the user's computer, as a standalone software package, or it can execute partly on the user's computer and partly on a remote computer. In the latter scenario, the remote computer can be connected to the user's computer through a LAN or a WAN, or the connection can be made to an external computer (for example, through the Internet using an Internet Service Provider).

Personnel that can benefit from the assessment solutions provided herein include members of the construction, legal, medical, technical, hospitality, military and educational communities. The use of words such as "assessments" as used herein is not meant to limit the invention. Facilitating user "operations" in the field, remote from his/her enterprise is the focus of the present invention. Examples of field assessments include job estimates/bids, crime scene investigations, medical procedures, daily punch/task list management, equipment/system testing/troubleshooting, customer interaction, sales, cost estimates, and third-party status/feedback collection. Accomplishment of an assessment can include methods for guided, interactive data collection by handheld computing device users, and storage and/or transmission of collected data for computer analysis. Data, once analyzed by a computer, can result in a complete assessment of or a request for additional data collection by the user.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims.

The invention claimed is:

1. A method, comprising:
accessing a template stored on a server located remotely from a handheld device, the template listing tasks to be completed before an end of a work shift;
reporting a status of each of the tasks at least once by synchronizing the handheld device to the server; and
updating the template responsive to the status with unfinished or new tasks at the end of the work shift.

2. The method of claim 1,
wherein the template lists the tasks that a worker completes during the work shift.

3. The method of claim 1, further comprising:
triggering generating another template in response to the updating, wherein the another template lists another tasks that another worker completes during another work shift.

4. The method of claim 1, further comprising:
wirelessly synchronizing the handheld device to the server.

5. The method of claim 1,
wherein the reporting the status of each of the tasks occurs at least once during the work shift.

6. A device, comprising:
a memory device configured to store instructions; and
a processing device configured to execute the instructions stored in the memory device to:
access a template stored on a server located remotely from the device, the template listing tasks to be completed before an end of a work shift;
report a status of each of the tasks at least once by synchronizing the device to the server; and
update the template responsive to the status with unfinished or new tasks at the end of the work shift.

7. The device of claim 6,
wherein the at least one template lists the tasks to be completed by a worker during the work shift.

8. The device of claim 6,
wherein the processing device is configured to execute the instructions stored in the memory device further to enable generating at least another template corresponding to at least another worker in response to the update; and
wherein the at least another template lists at least another task assigned to the at least another worker to be completed by the at least another worker before an end of another work shift corresponding to the at least another worker.

9. The device of claim 6,
wherein the processing device is configured to execute the instructions stored in the memory device further to wirelessly synchronize the device to the server.

10. The device of claim 6,
wherein the processing device is configured to execute the instructions stored in the memory device further to report the status of each of the tasks at least once during the work shift by synchronizing the device to the server.

11. A non-transitory computer-readable medium having instructions stored thereon that, in response to execution by a processing device, cause the processing device to:
access a template stored on a server located remotely from the device, the template listing tasks to be completed before an end of a work shift;
report a status of each of the tasks at least once by synchronizing the device to the server; and
update the template responsive to the status with unfinished or new tasks at the end of the work shift.

12. The non-transitory computer-readable medium of claim 11,
wherein the at least one template lists the tasks to be completed by a worker during the work shift.

13. The non-transitory computer-readable medium of claim 11,
- wherein execution of the instructions by the processing device cause the processing device to enable generating at least another template corresponding to at least another worker in response to the update; and
- wherein the at least another template lists tasks assigned to the at least another worker to be completed by the at least another worker before an end of a work shift corresponding to the at least another worker.

14. The non-transitory computer-readable medium of claim 11,
- wherein execution of the instructions by the processing device cause the processing device to wirelessly synchronize the device to the server.

15. The non-transitory computer-readable medium of claim 11,
- wherein execution of the instructions by the processing device cause the processing device to report the status of each of the tasks at least once during the work shift by synchronizing the device to the server.

\* \* \* \* \*

(12) EX PARTE REEXAMINATION CERTIFICATE (13101st)
United States Patent
Barbosa et al.

(10) Number: US 9,747,565 C1
(45) Certificate Issued: Nov. 26, 2025

(54) SYSTEM AND METHODS FOR MANAGEMENT OF MOBILE FIELD ASSETS VIA WIRELESS HANDHELD DEVICES

(71) Applicant: INTELLECTUAL VENTURES II LLC, Wilmington, DE (US)

(72) Inventors: Frank A. Barbosa, Carrollton, TX (US); Luis M. Ortiz, Albuquerque, NM (US)

(73) Assignee: FLEET CONNECT SOLUTIONS LLC, Austin, TX (US)

Reexamination Request:
No. 90/019,774, Dec. 13, 2024

Reexamination Certificate for:
Patent No.: 9,747,565
Issued: Aug. 29, 2017
Appl. No.: 15/071,003
Filed: Mar. 15, 2016

Related U.S. Application Data

(60) Continuation of application No. 14/480,297, filed on Sep. 8, 2014, now Pat. No. 9,299,044, which is a division of application No. 13/925,692, filed on Jun. 24, 2013, now Pat. No. 8,862,184, which is a continuation of application No. 12/547,363, filed on Aug. 25, 2009, now Pat. No. 8,494,581, which is a continuation of application No. 11/262,699, filed on Oct. 31, 2005, now Pat. No. 7,593,751, which is a continuation of application No. 09/955,543, filed on Sep. 17, 2001, now Pat. No. 6,961,586.

(60) Provisional application No. 60/233,120, filed on Sep. 18, 2000.

(51) Int. Cl.
| | | |
|---|---|---|
| H04W 64/00 | (2009.01) | |
| G06Q 10/06 | (2023.01) | |
| G06Q 10/0631 | (2023.01) | |
| G06Q 10/08 | (2024.01) | |
| G06Q 10/087 | (2023.01) | |
| G06Q 50/08 | (2012.01) | |
| G06Q 50/30 | (2012.01) | |
| G06Q 50/40 | (2024.01) | |
| H04L 29/08 | (2006.01) | |
| H04L 67/1095 | (2022.01) | |

(52) U.S. Cl.
CPC ..... *G06Q 10/063114* (2013.01); *G06Q 10/06* (2013.01); *G06Q 10/063118* (2013.01); *G06Q 10/08* (2013.01); *G06Q 10/087* (2013.01); *G06Q 50/08* (2013.01); *G06Q 50/40* (2024.01); *H04L 67/1095* (2013.01); *H04W 64/00* (2013.01)

(58) Field of Classification Search
None
See application file for complete search history.

(56) References Cited

To view the complete listing of prior art documents cited during the proceeding for Reexamination Control Number 90/019,774, please refer to the USPTO's Patent Electronic System.

*Primary Examiner* — Angela M Lie

(57) ABSTRACT

Communication from enterprise servers to handheld devices in the field supports dispatch, data synchronization, logistics and personnel. Bi-directional data delivery from enterprise-based servers over wireless data networks is enabled using wireless capabilities resident in handheld personal computing devices. Real time communications facilitates real-time access to remote programs, assistance and/or information related to the field operations and asset (personnel and inventory) resource management. Management is facilitated for at least one of: construction industry project analysis, HVAC system analysis, project management, equipment readiness inspection, troubleshooting, inventory tracking, inventory ordering, sales (e.g., providing cost estimates to customers), customer invoicing, conducting legal investigations, field data collection, and multi-user remote function coordination.

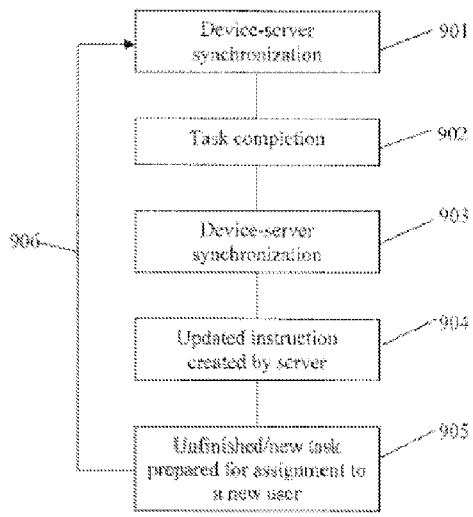

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-15 is confirmed.

\* \* \* \* \*